United States Patent
Patrykus

(10) Patent No.: US 6,837,934 B1
(45) Date of Patent: Jan. 4, 2005

(54) RACKING SYSTEM

(76) Inventor: Joel A. Patrykus, 3587 Seneca Rd., Wisconsin Rapids, WI (US) 54495

( * ) Notice: Subject to any disclaimer, the term of this patent is extended or adjusted under 35 U.S.C. 154(b) by 0 days.

(21) Appl. No.: 10/760,636

(22) Filed: Jan. 20, 2004

(51) Int. Cl.$^7$ .............................................. B05C 13/02
(52) U.S. Cl. .................... 118/500; 248/124.2; 248/129; 248/287.1; 211/118; 269/17; 269/71; 269/909
(58) Field of Search ..................... 118/500; 248/124.1, 248/124.2, 129, 287.1; 211/118, 182, 175; 269/17, 71, 909

(56) References Cited

U.S. PATENT DOCUMENTS

| | | |
|---|---|---|
| 2,312,914 A | 3/1943 | Koszeghy |
| 2,827,690 A | 3/1958 | Brown |
| 4,530,492 A | 7/1985 | Bork |
| 4,673,154 A | 6/1987 | Karapita |
| 4,838,199 A | 6/1989 | Weber |
| 5,141,211 A | 8/1992 | Adams, Jr. |
| 5,296,030 A | 3/1994 | Young |
| 5,568,954 A | 10/1996 | Burgess |
| 5,607,069 A | 3/1997 | Stroobants et al. |
| 5,707,450 A | 1/1998 | Thompson |
| 5,720,817 A | 2/1998 | Taylor |
| 5,915,742 A * | 6/1999 | Hung ........................ 29/281.5 |
| 6,296,239 B1 | 10/2001 | Sawyer |

OTHER PUBLICATIONS

"Tools USA" catalog vol. 327, 2003, copies of cover page & pp. 58–59.

* cited by examiner

*Primary Examiner*—Laura Edwards
(74) *Attorney, Agent, or Firm*—Stiennon & Stiennon

(57) ABSTRACT

A support rack, such as for supporting automobile body parts during painting, may be supported entirely from overhead by a single vertical support tube received within an overhead mounting bracket. A central frame has a sidewardly projecting cross member, which supports side members which extend front to back. A front frame projects frontwardly of the cross member, and has adjustable side support arms. When a fender is supported on one of the side members by an upper edge, one of the side support arms can be adjusted to properly engage the fender. Alternatively, the rack's vertical mount tube can be supported from below on a wheeled support frame. Adjustable pin collars can be moved along the side arm to support parts which have mounting holes.

14 Claims, 3 Drawing Sheets

RACKING SYSTEM

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to racks in general, and more particularly to racks for supporting objects for spray treatment such as in painting.

The modern automobile, as it comes from the manufacturer, presents a variety of exterior parts and body panels which are attractively finished to present an even and durable surface which resists the elements at the same time as it contributes to the public appearance of the vehicle. These body parts, formed of steel, aluminum, plastic, composites, or other material, are nonetheless subject to wear and corrosion by the elements, as well as structural damage by collision with other automobiles or objects.

In the event of damage, it is sometimes possible to repair and repaint a body part while it remains in place on the automobile. However, in many situations a superior result may be obtained by removing the distressed body part from the automobile and treating it while it is supported on a paint rack. The supported body part will usually be painted or otherwise coated by a paint gun utilizing compressed air to drive paint particles on to the exposed surfaces of the part. It will be observed that to obtain the best results, dust and other foreign particulate matter must be kept away from the applied paint while it is wet. To facilitate painting of automobile body parts, the painting is sometimes carried out on racks located within paint booths which may be enclosed, and which may employ positive pressure ventilation.

A variety of painting racks are known. These structures are typically adjustable arrangements of tubing which extend from the paint booth floor to support the parts in a convenient position for painting. Typically, a paint gun is supplied with compressed air from a hose which extends along the floor back to a source of compressed air, such as an air compressor. Floor mounted racks cannot help but present obstacles to the free movement of the paint gun, thereby restricting the convenient access of the operator to all faces of the part.

What is needed is an adjustable painting rack which supports parts above the floor, which permits ready cleaning of the floor beneath the rack, and which provides less interference with the movement of an air hose extending from a paint gun, which is at the same time compact and economically produced.

SUMMARY OF THE INVENTION

A support rack, such as for supporting automobile body parts during painting, may be supported entirely from overhead by a single vertical support tube received within an overhead mounting bracket. A central frame has a sidewardly projecting cross member, which supports side members which extend front to back. A front frame projects frontwardly of the cross member, and has adjustable side support arms. When a fender is supported on one of the side members by an upper edge, one of the side support arms can be adjusted to properly engage the fender. Alternatively, the rack's vertical mount tube can be supported from below on a wheeled support frame. Adjustable pin collars can be moved along the side arm to support parts which have mounting holes.

It is a feature of the present invention to provide a support for elements to be painted which is elevated above the floor of a paint booth.

It is another feature of the present invention to provide a rack for supporting elements to be painted which permits air hoses to pass unobstructed below the rack.

It is a further feature of the present invention to provide a paint rack which is compact, and which can be readily broken down for shipping into a minimum number of parts.

It is an additional feature of the present invention to provide a paint rack kit which has interchangeable parts to permit a variety of automotive body panels to be supported by substituting different parts of the kit on the rack.

Further objects, features and advantages of the invention will be apparent from the following detailed description when taken in conjunction with the accompanying drawings.

DESCRIPTION OF THE PREFERRED EMBODIMENTS

Figure 1:
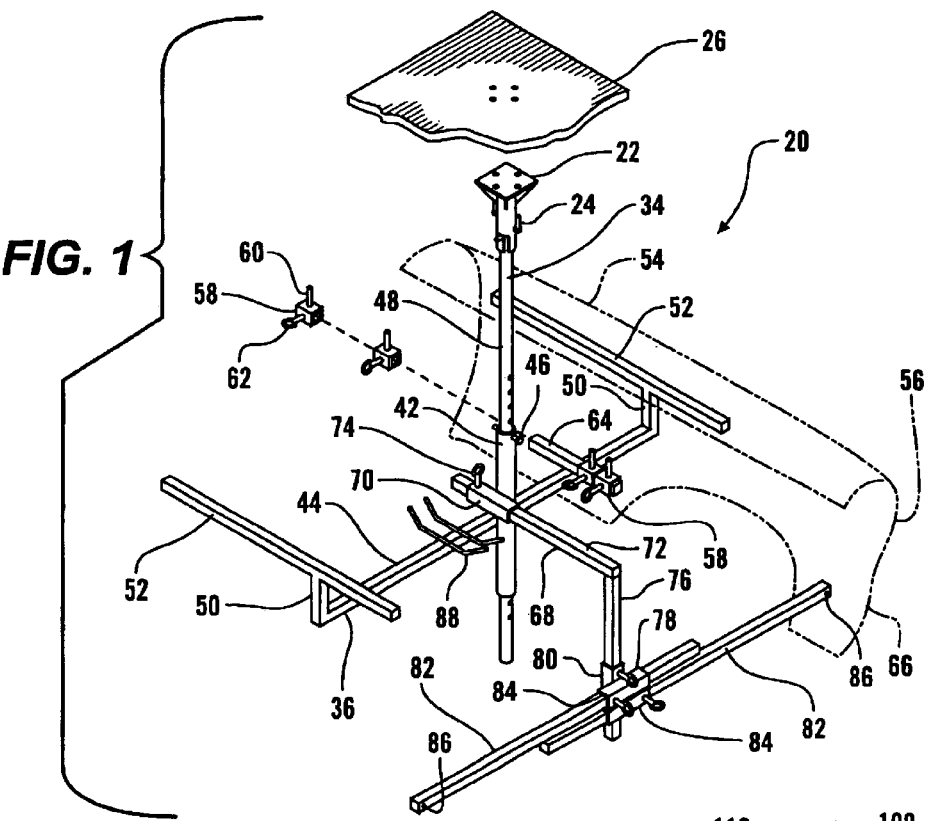
FIG. 1 is an exploded isometric view of the overhead mounted painting rack of this invention, with an automobile fender shown in phantom view.
Figure 2:
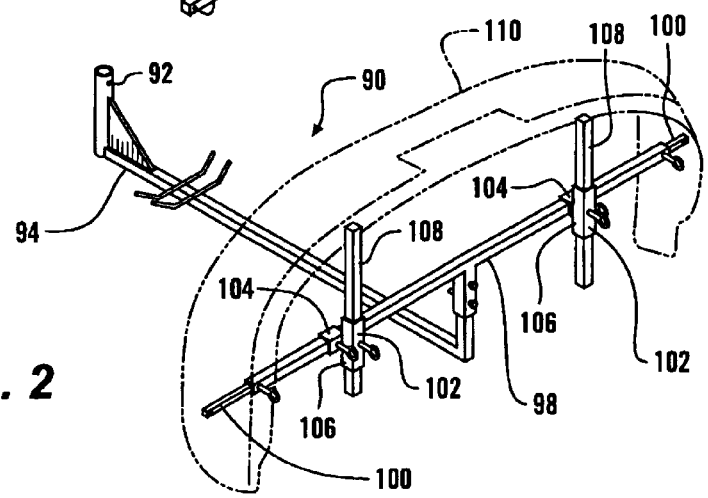
FIG. 2 is an isometric view of an alternative support element for the rack of FIG. 1, with an automobile bumper cover shown in phantom view.
Figure 3:
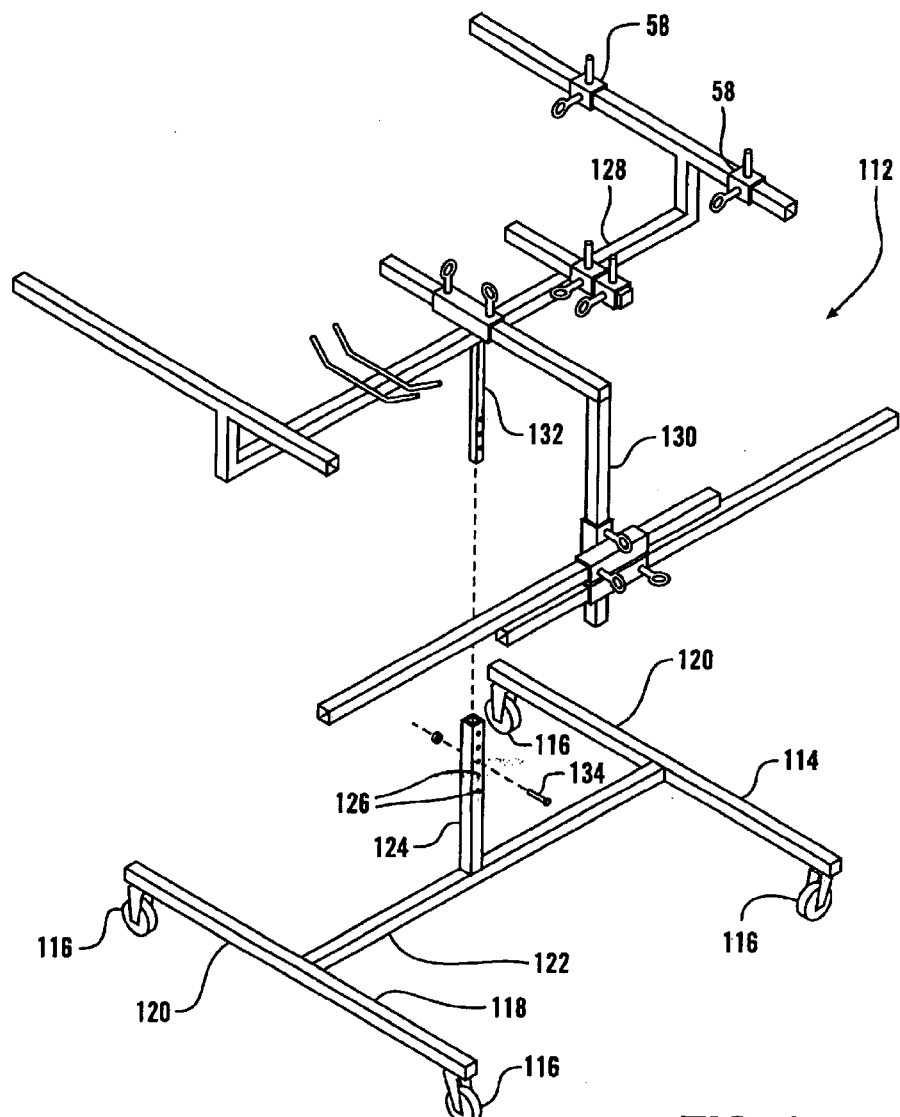
FIG. 3 is an isometric view of a caster mounted painting rack of this invention.
Figure 4:
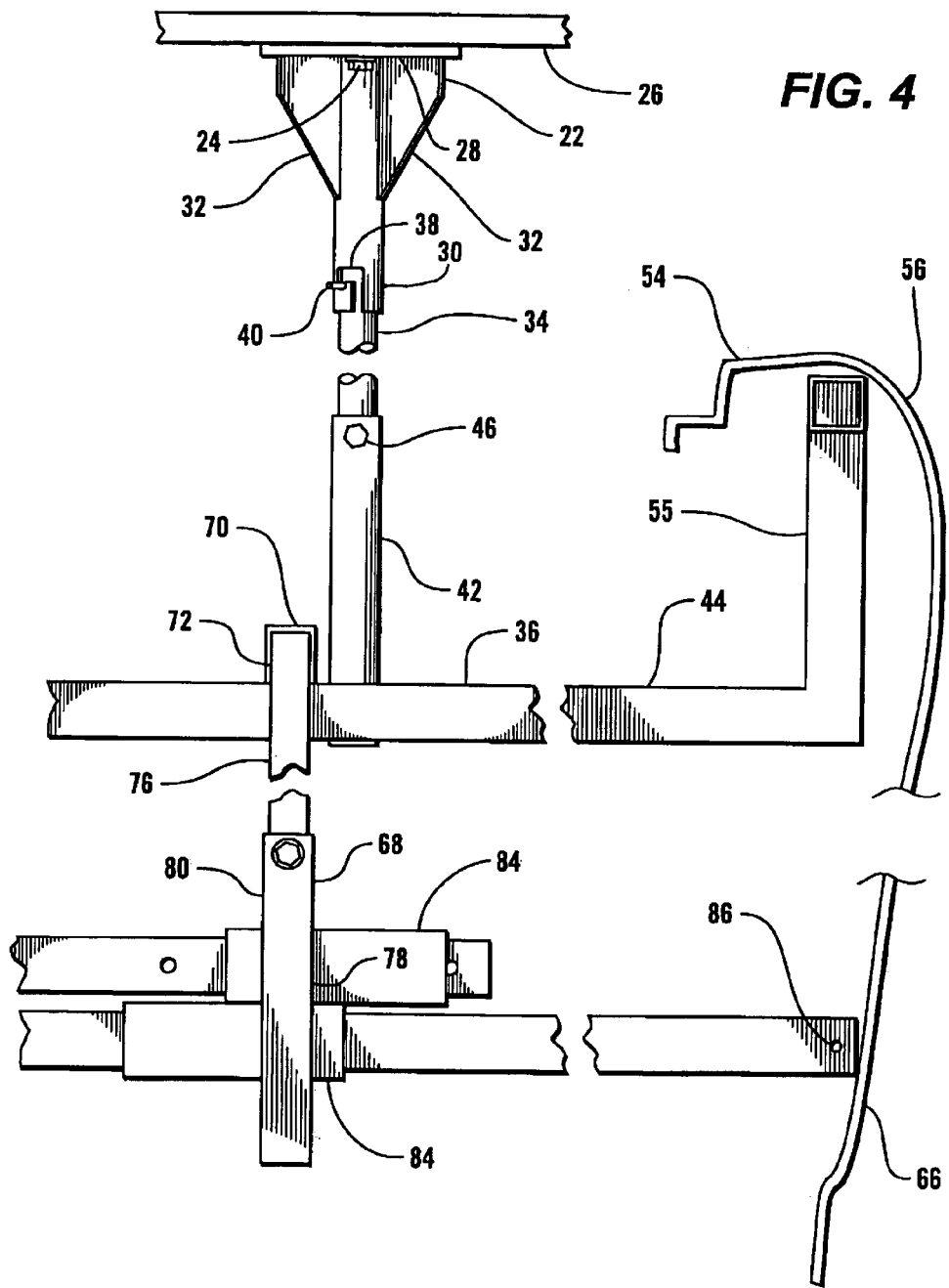
FIG. 4 is a fragmentary front elevational view of the rack of FIG. 1.

Referring more particularly to FIGS. 1–4, wherein like numbers refer to similar parts, a rack assembly 20 is shown in FIG. 1. The rack assembly 20 is supported from overhead by an overhead mounting bracket 22 which is connected by fasteners 24 to an overhead element 26 such as a ceiling truss or bean. As best shown in FIG. 4, the mounting bracket 22 has a base plate 28 from which a cylindrical pipe 30 extends downwardly. Four ribs 32 extend from the paper 30 to the base plate 28. The fasteners 24 extend through the base plate 28 to be secured within the overhead element 26. A vertical support tube 34 is engaged within the overhead mounting bracket 22 and extends downwardly to engage a central frame 36. The lower end of the mounting bracket 22 has two opposed inverted J-shaped slots 38 which open downwardly. The upper end of the vertical support tube 34 has two sidewardly protruding pins 40 which extend into the J-shaped slots 38 to enable the vertical support tube to be supported on the bracket 22. This arrangement permits the vertical support tube 34 to be readily and conveniently engaged with the overhead bracket from below, without requiring a ladder.

The central frame 36 has a vertically extending mount tube 42 which is welded to a cross member 44 which extends in a side-to-side direction. The mount tube 42 has a pair of opposed holes which align with holes in the vertical support tube 34 to receive a bolt 46 therethrough. The vertical support tube 34 preferably has multiple holes 48 evenly spaced along its lower end to permit the central frame 36 to be positioned at the desired height beneath the bracket 22.

A mount tube 42 is approximately centered on the cross member 44. The cross member 44 has an upturned segment 50 at each end which is terminated by a front-to-back extending side member 52. The side member 52 is fixed to the upturned segment 50 such that about one third of the side member extends frontwardly and two thirds of the side member extend rearwardly. Each side member 52 serves to support the upper edge 54 of a vehicle body part such as a fender panel 56. Most vehicle fender panels may be supported directly on the side member. Some double-walled fender panels may be more readily mounted on the side members 52 by connecting adjustable pin collars 58 to the side members, and inserting the upwardly extending pins 60 of the pin collars into vertically extending holes normally found on some fender panels. Each pin collar 58 is a short length of tubing which slides over the side member 52, and which may be fixed in place by an adjustable eyelet screw 62. When not in use, the adjustable pin collars may be stored on a storage arm 64 which is fixed to the cross member 44. Two pin collars 58 may be stored on the storage arm 64 in front of the cross member, and two behind the cross member.

Typically, a fender panel 56, when supported along its upper edge 54, will tend to hang such that the lower portions 66 of the fender panel will tip towards the interior of the rack 20. When struck by the compressed air of the paint gun, the fender panel can sway. For optimal painting results it is desirable that the panel being treated be fixed in place as much as possible. A front frame 68 is adjustably received within a front tube 70 which is fixed to the cross member 44 alongside the mount tube 42. The front frame has a frontwardly extending front arm 72 which is received within the front tube, and which can be slid to a desired position, and then clamped in place by the adjustment of the eyelet screws 74. The front arm 72 has a front down arm 76 which extends downwardly at the forward end of the front arm 72. A forward bracket 78 is mounted to the front down arm 76. The forward bracket 78 is composed of a vertically extending tube 80 to which are attached two parallel sidewardly extending square tubes 84, each with an adjustable eyelet screw. The vertically extending tube 80 of the forward bracket 78 also has an adjustable eyelet screw to permit the bracket to be positioned as desired vertically.

An adjustable side support arm 82 extends through each of the sidewardly extending tubes 84. As shown in FIG. 4, the side support arms 82 may thus be extended to engage the lower portions 66 of a fender panel 56. To limit the retraction of the support arms 82, they may be provided with a pin 86 at their outward ends.

It will be noted that the entire assembly 20 is supported from overhead in a position adjustably spaced above the floor. This spacing permits an operator to pass around the rack and the workpiece with minimal impediment to moving the air hose connected to the paint gun. To facilitate temporary storage of the paint gun, two U-shaped wires may be fixed to the cross member to define a gun support 88. The two side members 52 permit two fenders to be mounted to the rack assembly 20 at once. Likewise the two side support arms 82 engage the two fenders when mounted on the side members 52. The rack assembly 20, with its support from a single point is thus compact, and because of its minimal structure, is economical to produce and relatively lightweight.

The rack assembly 20 may be provided with additional frame elements to permit it to be configured to support other structures for painting. For example, the bumper cover frame 90, shown in FIG. 2, has a vertical mount tube 92 which mounts to the vertical support tube 34. A forward arm 94 extends frontwardly from the vertical mount tube 92 and has a front member 98 which extends sidewardly, and which has an adjustable side member 100 telescopically received within each end. Eyelet screws are adjustable to retain the side members 100 at the desired extension. Two bracket elements 102 are mounted to the front member 98 inwardly of the side members 98. Each bracket element 102 has a horizontal tube 104 which is positionable along the front member and held in place by an adjustable eyelet screw, and a vertical tube 106 which receives a vertical member 108 and which also has an eyelet screw to permit the vertical member to be positioned at the desired height above the front member 98. By adjusting the vertical members 108 and the side members 100, the frame 90 can be configured to support an automobile bumper cover 110. The degree of adjustment possible takes account of the wide variety of shapes of automobile bumper covers.

In some circumstances, it may not be possible or desirable to support the rack assembly from overhead, for example where the vertical distance is too great, or where it is desired to be able to move the rack. In such circumstances, the wheeled rack assembly 112 shown in FIG. 3 may be employed. The rack assembly 112 is similar to the rack assembly 20, with the difference that the overhead mounting bracket and the overhead vertical support tube are replaced with a wheeled support frame 114 having four casters 116 with brakes (not shown). The wheeled support frame 114 has an H-shaped base 118 with two side members 120 which are connected by a single connecting member 122. A vertical support tube 124 extends upwardly from the connecting member 122, and has multiple mounting holes 126 to permit the central frame to be positioned at the desired vertical elevation. The support tube 124 may be a square tube. The central frame 128 and front frame 130 of the wheeled rack assembly 112 may be substantially the same as those of the rack assembly 20 described above, except that the mount tube 132 extends downwardly to be pinned within the upwardly extending support tube. Both the mount tube 132 and the support tube may have multiple holes to receive the pinning bolt 134 to permit a greater range of heights. The wheeled rack assembly 112 functions to support fender panels in the same manner as the rack 20.

It should be noted that the eye screws can also be used as tiedown points for the connection of wires or bungee cords to the part being treated. It should be noted that where eyelet screws or fastening bolts are disclosed, other means of adjustably fastening one part to another may be employed.

It is understood that the invention is not limited to the particular construction and arrangement of parts herein illustrated and described, but embraces all such modified forms thereof as come within the scope of the following claims.

I claim:

1. A rack for the support of workpieces for the painting of the workpieces, the rack comprising:
   a vertical support tube which is supported against vertical movement;
   a vertical mounting tube connected to the support tube;
   a central frame connected to the vertical mounting tube, the central frame having a cross member which extends sidewardly from the vertical mounting tube, and a first side member which is fixed to the cross member and which extends in a front to back direction; and
   a front frame which is positionably connected to the central frame, the front frame having a front arm which extends frontwardly from the vertical mounting tube, and at least one adjustable side support arm which is adjustably positioned on the front arm and which is positionable with respect to the side support arm, the side support arm extending towards the side member, such that a workpiece supported along an upper edge on the first side member is engageable by the adjustable side support arm at a position below the workpiece upper edge.

2. The apparatus of claim 1 wherein the vertical support tube extends upwardly from the central frame, and further comprising an overhead mounting bracket for attachment to an overhead element, and wherein the vertical support tube is fixed to the overhead mounted bracket such that the entire apparatus is spaced above a floor.

3. The apparatus of claim 1 wherein the vertical support tube extends downwardly from the central frame, and further comprising a support frame positioned beneath the central frame, and wherein the vertical support tube is fixed to the support frame.

4. The apparatus of claim 3 further comprising a plurality of wheels mounted to the support frame.

5. The apparatus of claim 1 further comprising an adjustable pin collar mounted to one of the cross member or the first side member, the adjustable pin collar having an upwardly projecting pin thereon, the pin collar being positionable along the first side member to engage a portion of the workpiece.

6. The apparatus of claim 1 further comprising a second side member connected to the cross member and spaced from the first side member such that the vertical mount tube is positioned between the first side member and the second side member.

7. The apparatus of claim 5 further comprising a storage arm mounted to the cross member and extending in a front to back direction, and wherein the adjustable pin collar is mounted to the storage arm.

8. The apparatus of claim 1 wherein the apparatus is part of a kit of parts for making two workpiece support rack structures, and further comprising a second central frame comprising:
   a vertical mount tube which is dimensioned to be received on the vertical support tube;
   a forward arm which extends frontwardly from the vertical mount tube;
   a front member which is fixed to the forward arm and which extends sidewardly;
   a plurality of vertical brackets mounted to the front member and sidewardly positionable thereon; and
   a vertical member positionably received within each of the vertical brackets, the vertical members being thus positionable with respect to the front arm to accommodate a selected automobile part.

9. A rack for the support of workpieces for the painting of the workpieces, the rack comprising:
   an overhead mounting bracket for attachment to an overhead element;
   a vertical support tube which is fixed to the overhead mounting bracket, and which extends downwardly therefrom;
   a vertical mounting tube connected to the support tube;
   a central frame connected to the vertical mounting tube beneath the overhead mounting bracket, the central frame having a cross member which extends sidewardly from the vertical mounting tube, and a first side member which is fixed to the cross member and which extends in a front to back direction; and
   a front frame which is positionably connected to the central frame, the front frame having a front arm which extends frontwardly from the vertical mounting tube, and at least one adjustable side support arm which is adjustably positioned on the front arm and which is positionable with respect to the side support arm, the side support arm extending towards the side member, such that a workpiece supported along an upper edge on the first side member is engageable by the adjustable side support arm at a position below the workpiece upper edge, the entire apparatus being supported from the overhead element to be spaced above a floor.

10. The apparatus of claim 9 further comprising an adjustable pin collar mounted to one of the cross member or the first side member, the adjustable pin collar having an upwardly projecting pin thereon, the pin collar being positionable along the first side member to engage a portion of the workpiece.

11. The apparatus of claim 9 further comprising a second side member connected to the cross member and spaced from the first side member such that the vertical mount tube is positioned between the first side member and the second side member.

12. The apparatus of claim 10 further comprising a storage arm mounted to the cross member and extending in a front to back direction, and wherein the adjustable pin collar is mounted to the storage arm.

13. The apparatus of claim 9 wherein the apparatus is part of a kit of parts for making two workpiece support rack structures, and further comprising a second central frame comprising:
   a vertical mount tube which is dimensioned to be received on the vertical support tube;
   a forward arm which extends frontwardly from the vertical mount tube;
   a front member which is fixed to the forward arm and which extends sidewardly;
   a plurality of vertical brackets mounted to the front member and sidewardly positionable thereon; and
   a vertical member positionably received within each of the vertical brackets, the vertical members being thus positionable with respect to the front arm to accommodate a selected automobile part.

14. A rack for the support of workpieces for the painting of the workpieces, the rack comprising:
   an overhead mounting bracket for attachment to an overhead element;
   a vertical support tube which is fixed to the overhead mounting bracket, and which extends downwardly therefrom;
   a vertical mounting tube connected to the support tube;
   a central frame connected to the vertical mounting tube beneath the overhead mounting bracket, the central frame having a forward arm which extends frontwardly from the vertical mount tube;
   a front member which is fixed to the forward arm and which extends sidewardly;
   a plurality of vertical brackets mounted to the front member and sidewardly positionable thereon; and
   a vertical member positionably received within each of the vertical brackets, the vertical members being thus positionable with respect to the front arm to accommodate a selected automobile part, the entire apparatus being supported from the overhead element to be spaced above a floor.

* * * * *